(No Model.)
C. M. KIMBALL.
BALL BEARING MECHANISM FOR CONVERTING RECIPROCATORY INTO ROTARY MOTION.
No. 576,199.  Patented Feb. 2, 1897.
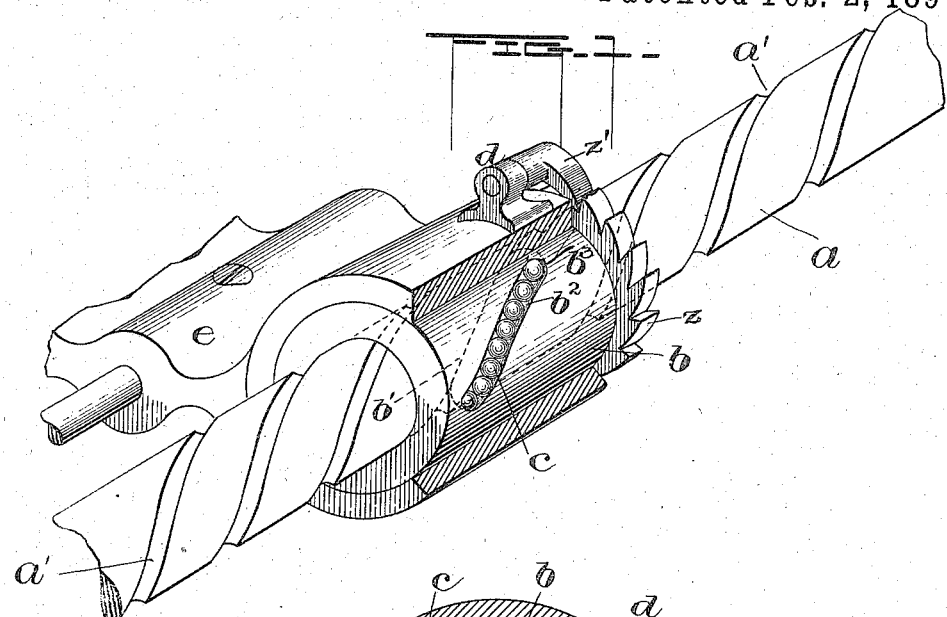
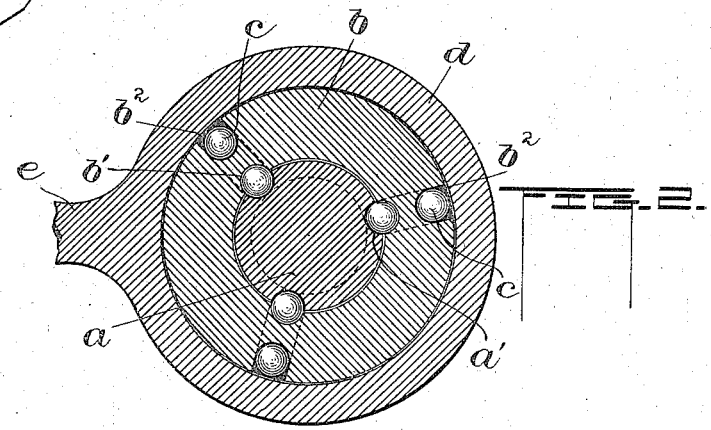
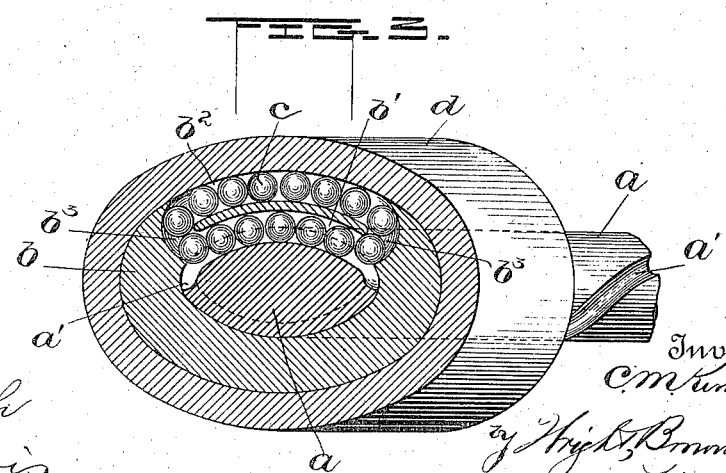
Witnesses
O. W. Smith
F. F. Davis
Inventor
C. M. Kimball
by Wright, Brown & Quinby
his Attorneys

United States Patent Office.

CHARLES M. KIMBALL, OF TOLEDO, OHIO.

BALL-BEARING MECHANISM FOR CONVERTING RECIPROCATORY INTO ROTARY MOTION.

SPECIFICATION forming part of Letters Patent No. 576,199, dated February 2, 1897.

Application filed March 23, 1896. Serial No. 584,482. (No model.)

*To all whom it may concern:*

Be it known that I, CHARLES M. KIMBALL, of Toledo, in the county of Lucas and State of Ohio, have invented certain new and useful Improvements in Ball-Bearing Mechanism for Converting Reciprocating into Rotary Motion, of which the following is a specification.

This invention relates to mechanism for converting reciprocating into rotary motion, and particularly to that type wherein the reciprocation of a sleeve on a shaft turns the latter through engagement of spirals; and the object of the invention is to reduce to the minimum friction attendant on such engagement and thereby both increase the ease of operation and prolong the life of the mechanism.

To the above end the invention consists in certain novel features of construction and combinations of parts recited in the appended claims.

The drawings which accompany and form part of this specification illustrate an embodiment of the invention.

Figure 1 shows a perspective view of the apparatus, partially cut away. Fig. 2 shows a cross-section of the same. Fig. 3 shows a diagonal section.

The letter $a$ designates a shaft which is to be driven, and this shaft is formed with one or more spiral grooves $a'$, semicircular in cross-section and extending on such a pitch as to permit turning of the shaft by pressure directed longitudinally of the shaft against the sides of the groove. A sleeve $b$ embraces said shaft and is designed to be reciprocated thereon, and the said sleeve is formed in its interior surface with one or more spirally-extending grooves $b'$ of the same pitch as the grooves $a'$ in the shaft and semicircular in cross-section, so that by confronting the shaft-grooves they may form therewith channels circular in cross-section. In its exterior surface the sleeve is formed with one or more grooves $b^2$, extending spirally the same as the interior grooves and differing only in having twice the depth of those grooves. Round holes or ports $b^3$ made through the sleeve connect the ends of the interior and exterior grooves and complete an endless channel or passage-way. This passage-way is filled with antifriction-balls $c$, which, where they interpose between the sleeve and the shaft, are half contained in the groove of the shaft and half in the groove of the sleeve, as clearly shown in Fig. 2, so that they constitute the connection between the shaft and sleeve, whereby motion is transmitted from one to the other, while at the same time they minimize friction occasioned by movement of one of those parts relative to the other.

The depth of the exterior groove $b^2$ permits the balls to be wholly received in them, and a cylindrical casing $d$, fitting closely over the sleeve and secured to it, constitutes a closure for said groove.

In operation it will be seen that the balls are free to make the circuit of the endless channel in either direction, so that all friction may be taken up.

The casing $d$ may form part of a cross-head $e$, to which suitable driving mechanism may be applied.

This ball-bearing device has been devised for use in the boat-propelling apparatus shown in my Patent No. 552,910, dated January 14, 1896, but its use is not limited to such application, and may extend to various forms of mechanism.

The cross-head and sleeve will be rotatively connected in any suitable manner, as by means of a ratchet $z$ on the sleeve and a pawl $z'$ on the cross-head, as shown in Fig. 1, an arrangement similar to that shown in my former patent above mentioned.

Having thus described my invention, what I claim is—

1. The combination of a spirally-grooved shaft; a sleeve embracing said shaft and grooved in its interior surface on the same pitch as said shaft and having a back channel extending spirally on the same pitch as and communicating at its ends with the interior groove forming therewith an endless raceway spiral throughout its extent; and a set of antifriction-balls filling said channel and the channel formed between the interior groove and the shaft-groove.

2. The combination of a spirally-grooved shaft; a sleeve embracing said shaft and spirally grooved in both its interior and exterior surfaces on the same pitch as the shaft and formed with ports connecting the ends of said interior and exterior grooves to form an endless raceway; antifriction-balls filling said raceway and engaging the shaft-groove; and a cylindrical casing fitting over the sleeve and closing the exterior groove therein.

3. The combination of a spirally-grooved shaft; a driving-sleeve embracing the same and adapted to be reciprocated thereon, said sleeve having interior and exterior grooves extending spirally to correspond with the shaft-groove, and ports connecting said grooves to form an endless raceway; antifriction-balls filling said raceway and engaging the shaft-groove; and a cross-head having a cylindrical part embracing the sleeve and closing the exterior groove therein.

In testimony whereof I have signed my name to this specification, in the presence of two subscribing witnesses, this 17th day of March, A. D. 1896.

CHARLES M. KIMBALL.

Witnesses:
THOS. PULFORD,
R. W. HAZELLINE.